G. DAVIS.
LOADING MECHANISM.
APPLICATION FILED OCT. 13, 1910.
1,007,928.
Patented Nov. 7, 1911.
4 SHEETS—SHEET 2.
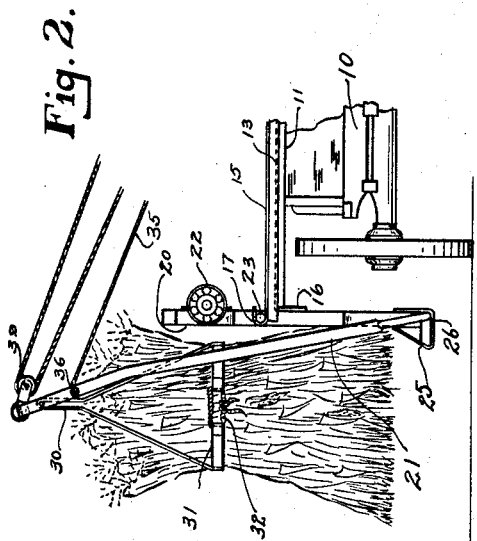
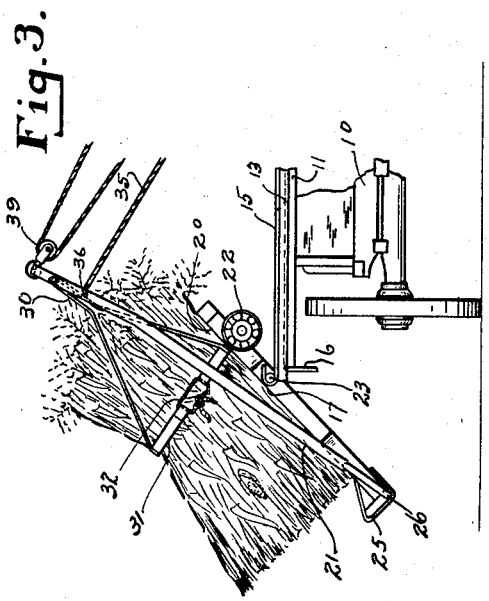
WITNESSES:
INVENTOR.
Granville Davis
BY
ATTORNEY.

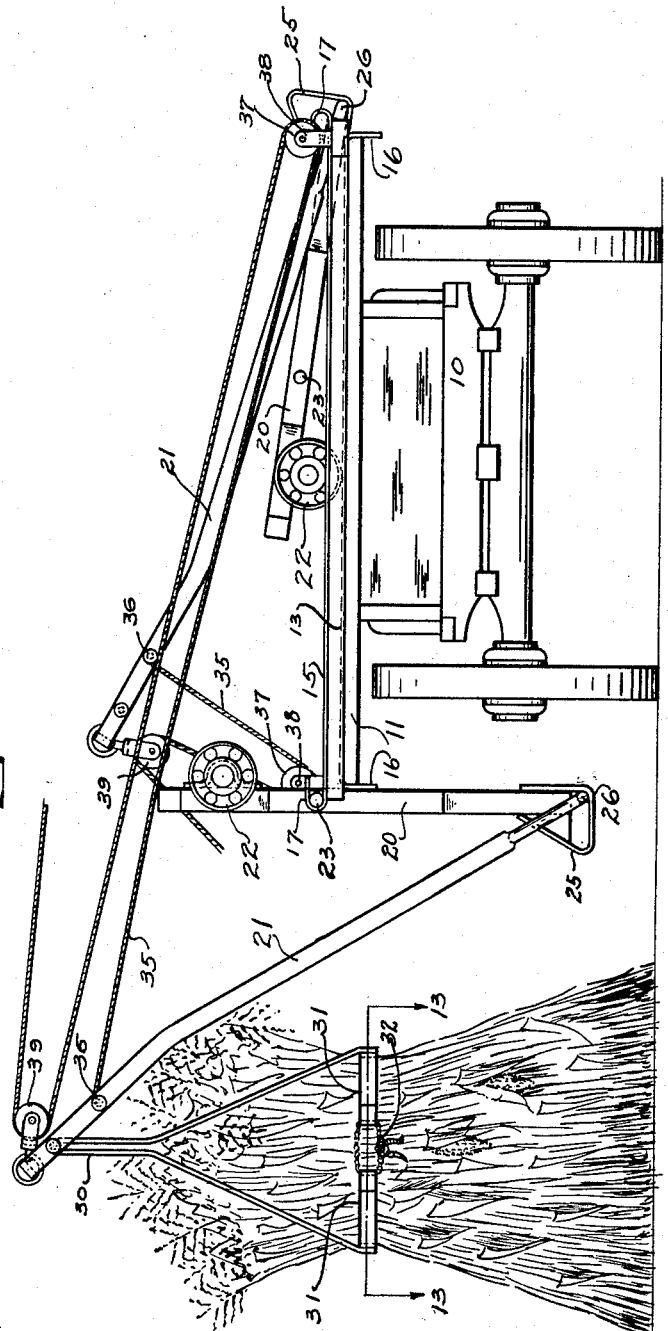

G. DAVIS.
LOADING MECHANISM.
APPLICATION FILED OCT. 13, 1910.
1,007,928.
Patented Nov. 7, 1911.
4 SHEETS—SHEET 3.
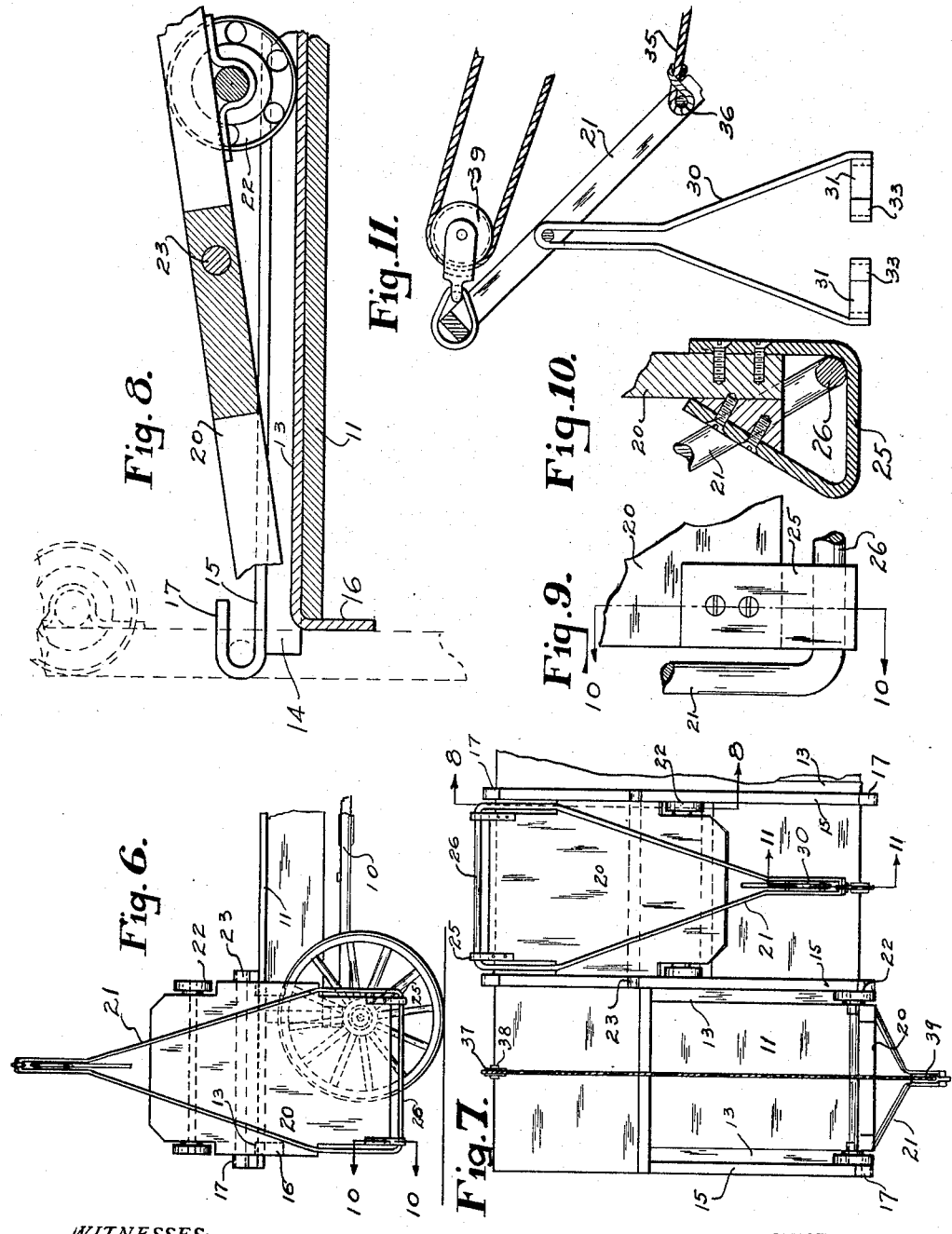
WITNESSES:
INVENTOR.
Granville Davis
BY
ATTORNEY.

G. DAVIS.
LOADING MECHANISM.
APPLICATION FILED OCT. 13, 1910.
1,007,928.
Patented Nov. 7, 1911.
4 SHEETS—SHEET 4.
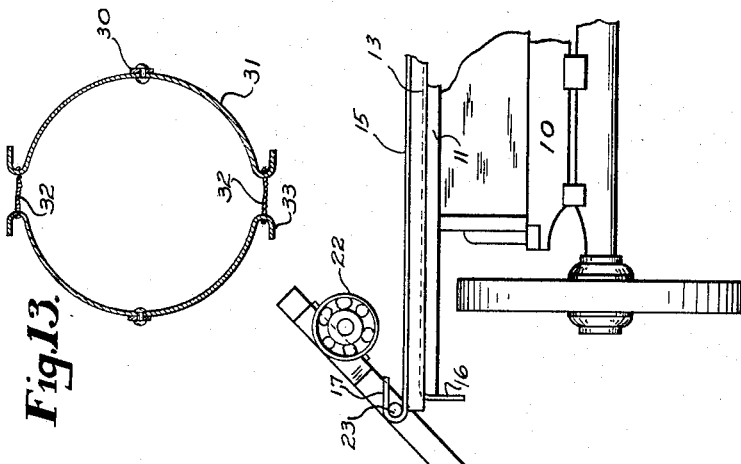
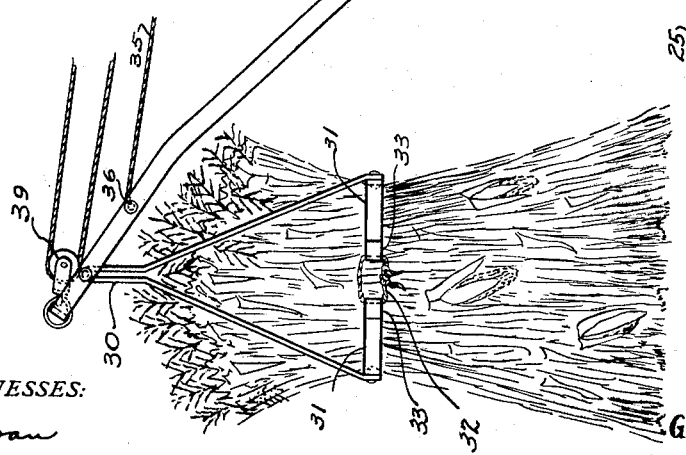
WITNESSES:
J H Swan
O. M. McLaughlin
INVENTOR.
Granville Davis.
BY
V H Lockwood,
ATTORNEY.

UNITED STATES PATENT OFFICE.

GRANVILLE DAVIS, OF INDIANAPOLIS, INDIANA, ASSIGNOR OF ONE-FOURTH TO VIRGIL H. LOCKWOOD, OF INDIANAPOLIS, INDIANA.

LOADING MECHANISM.

1,007,928.  Specification of Letters Patent.  Patented Nov. 7, 1911.

Application filed October 13, 1910. Serial No. 586,845.

*To all whom it may concern:*

Be it known that I, GRANVILLE DAVIS, of Indianapolis, county of Marion, and State of Indiana, have invented a certain useful Loading Mechanism; and I do hereby declare that the following is a full, clear, and exact description thereof, reference being had to the accompanying drawings.

The object of this invention is to improve the construction of the loading and unloading device shown in my Patent No. 923,028, dated May 25, 1909, so that the device can reach farther out from the vehicle to the thing to be loaded and can be more easily loaded and unloaded, and the loader can be used as a truck for transporting the bales or load around on the platform when the platform is like a warehouse wharf, railroad platform or a steamboat deck.

In the drawings Figure 1 is a rear elevation of a vehicle and loading device in position for grasping a shock of fodder, the end of the cable being broken away. Fig. 2 shows a part of what appears in Fig. 1 after the shock is lifted from the ground. Fig. 3 shows the same after the shock has been partly lifted to the platform of the vehicle. Fig. 4 is the same after the shock is upon the edge of the platform. Fig. 5 shows the shock in the final position. Fig. 6 is a side elevation of the rear part of the vehicle with one loader in an inverted position. Fig. 7 is a plan view of the rear part of the vehicle with two loaders shown so that the rear one is in a vertical position and the forward one is in a horizontal position. Fig. 8 is a section on the line 8—8 of Fig. 7, with the part of the loader shown by dotted lines in inverted position. Fig. 9 is an elevation of the lower left hand corner of Fig. 6, parts being broken away. Fig. 10 is a section on the line 10—10 of Figs. 6 and 9. Fig. 11 is a section on the line 11—11 of Fig. 7, but on a large scale. Fig. 12 shows the loader reaching far from the vehicle for the load, parts being broken away. Fig. 13 is a section on the line 13—13 of Fig. 1, omitting the shock of fodder. Fig. 14 is a section on the line 14—14 of Fig. 12.

There is shown herein a wagon 10 with a platform 11 thereon, preferably long enough to carry several shocks of fodder, but while this device is shown and was originally designed for loading shocks of fodder on wagons, it is equally well adapted for loading barrels, hogsheads, and other bundles or packages.

Referring to Figs. 7 and 8, there are a number of transversely disposed guides for the loaders secured on the platform. These guides have a horizontal portion 13 and a vertical portion 14 above arranged together like angle iron, and a bar 15 secured along the upper edge of the vertical portion 14. The lower portion 13 is turned down at 16 over the edge of the platform. The bar 15 extends beyond the end of the portion 14 and is turned back upon itself to form an upwardly extending hook 17. Each loader consists essentially of two parts, a frame 20 which never leaves the platform entirely and a derrick 21 which is pivotally mounted in the outer end or lower end of the frame 20. The frame 20 is preferably about as wide as a shock of fodder or a barrel or other thing to be loaded consisting of suitable side bars and cross bars and has rollers 22 mounted under one end and adapted to travel in the guide ways heretofore described, and run upon the metal plate 13, see Fig. 8. A pin 23 extends laterally from the sides of the frame 20 between the ends thereof, but preferably nearer the end which carries the rollers. These pins project far enough to engage and catch the hooks 17, as the frame is being pulled off the platform, to stop and limit such movement of the frame 20 or the loader and prevent its escape from the platform and to serve as fulcrums for the loader or frame 20 while the same is being manipulated.

At its outer end the frame 20 carries a pair of stirrups or metal bars 25, see Fig. 10, in which a bar 26 on the derrick is fulcrumed. The stirrup 25 is large enough to permit considerable lateral rocking movement of the derrick so that if the wagon be driven within reasonable proximity of the shock or thing to be loaded, the derrick can be moved into position over or near the shock. The outer end of the derrick carries a pair of spreading bars 30 which are fulcrumed at their upper ends to the derrick and at their lower ends are pivoted to a pair of semi-circular tie bars 31 adapted to be placed around the shock and caught together by ropes or ties 32 which are fastened over the turned or hooked ends 33 of the tie bars 31, see Figs. 12 and 13. The ties 32 are drawn tightly so that the bars 31 will clamp the shock tightly enough to hold it while the bars are being lifted. A cable 35 is connected at one end to the derrick at 36 and extends therefrom across the platform under a sheave wheel 37 mounted in a bracket 38 which is secured to the platform near one edge and thence the cable runs over a block and tackle 39 at the upper and outer end of the derrick and thence back to the side of the vehicle where a man can stand and by pulling the cable toward him, load the shock.

The operation of the device is as follows. The vehicle is driven beside the shock, as shown in Fig. 1. Then the one loader is drawn off the platform until it is stopped by the hook 17. The derrick 21 is then pulled over in proximity with the shock and the shock fastened thereto, as shown. Then the operator steps to the other side of the wagon and draws the cable. As he draws the cable the shock will be lifted from the position shown in Fig. 1 first to the position shown in Fig. 2 where the derrick 21 and the frame 20 of the loader are both substantially vertical. Further movement of the cable will bring the parts in the position shown in Fig. 3 where the loader is inclined at substantially a right angle, but still the weight of the shock is carried by the loader. Further movement will bring the shock into the position shown in Fig. 4 where it is balanced on the edge of the platform, and, therefore, supported by the platform. Further movement draws the loader and shock across the platform to the desired position shown in Fig. 5. In unloading the loader is pushed off the platform from the position shown in Fig. 5 to that shown in Fig. 3 and then is held by the cable until it resumes the position shown in Fig. 1. The exact distance between the wagon and shock is immaterial in the loading as is shown by comparing Figs. 1 and 12, for since the loader consists of two parts 20 and 21 pivoted together, they may be extended as far out as required.

The different loaders on the same platform are arranged reversely with reference to each other in succession, so that one loader will pick up one shock on one side of the wagon and the next loader pick up a shock on the other side of the wagon, and when the shocks are all in the wagon, their positions with relation to each other will be successively reversed.

The loaders have wheels 22 which are under the frame 20 of the loader near enough to one end so as to enable the loader to be used as a truck in many situations. Thus in handling bales of cotton the platform 11 might be the truck of a warehouse or of a wharf or the deck of a steamboat upon which the bale is lifted from the wagons or from the wharf to the steamboat or from the steamboat to the wharf, and after it is thus placed upon a platform, the bale lies on the loader and it can be left thereon and wheeled to any part of the platform, warehouse, wharf or steamboat deck without the use of any other truck. Hence, in many situations this loader can be used for a double purpose, loading and unloading articles from one elevation to another and also wheeling the same to the desired location.

I claim as my invention:

1. The combination with a platform, of a loader frame adapted to be moved thereon, means on the platform for limiting the outward movement of said frame so that it will be suspended in substantially a vertical position, a derrick fulcrumed on the lower end of said frame, means on the other end of the derrick for grasping the thing to be loaded, and a cable connected with the outer end of the derrick for drawing it and said frame and the load on the platform.

2. The combination with a platform, a loader frame movable on said platform, hooks on the edge of the platform, means on the frame between its ends for engaging said hooks whereby the platform is suspended, a derrick fulcrumed from the lower end of the frame, means pivotally connected with the other end of the frame for grasping the thing to be loaded, and a cable connected to the outer end of said derrick and extending across the platform.

3. The combination with a platform, a loader frame movable on said platform, hooks on the edge of the platform, means on the frame between its ends for engaging said hooks whereby the platform is suspended, a derrick fulcrumed loosely in the lower end of said frame so the derrick can rock transversely and independently of the frame, means pivotally connected with the other end of the frame for grasping the thing to be loaded, and a cable connected to the outer end of said derrick and extending across the platform.

4. The combination with a platform, a loader frame movable on said platform, stirrups secured to the end of said frame, a derrick with a cross bar and one end extending loosely through said stirrups so that the derrick can be rocked transversely and independently of the frame, means pivotally connected with the other end of the frame for grasping the thing to be loaded, and a cable connected to the outer end of said derrick and extending across the platform.

5. The combination with a platform, a pair of parallel guide bars secured thereon, a frame adapted to be moved on the platform between said guide bars, hooks on the ends of said guide bars, means on the frame between its ends for engaging said hooks so that when in its outer position said frame will be suspended, wheels on the upper end of said frame adapted to travel on said guide bars, a derrick fulcrumed loosely in the lower end of said frame so the derrick can rock transversely and independently of the frame, means pivotally connected with the other end of the frame for grasping the thing to be loaded, and a cable connected to the outer end of said derrick and extending across the platform.

6. The combination with a platform, a loader frame movable on said platform, hooks on the edge of the platform, means on the frame between its ends for engaging said hooks whereby the platform is suspended, a derrick fulcrumed in the lower end of the frame, means pivotally connected with the other end of the frame for grasping the thing to be loaded, a cable connected with the upper end of the derrick, a sheave wheel mounted in connection with the opposite edge of the platform and about which said cable passes, and a sheave wheel pivoted to the outer end of the derrick after the cable passes the sheave wheel on the platform.

7. A loading and unloading device having means for grasping the thing to be loaded consisting of a pair of semi-circular bars with their ends turned back to form hooks, means connected centrally of said bars for lifting the same, and cables for drawing the hooked ends of said bars toward each other for tightening the same around the thing to be loaded.

8. The combination of a platform, a loader, wheels mounted under said loader near one end for supporting the loader on said platform so that the loader when removed from said platform can be operated like a truck for wheeling the load, a clutch at the edge of the platform for holding said loader when loading and from which the loader may be readily removed, and a detachable cable for manipulating the loader while loading it on or unloading it from said platform.

In witness whereof, I have hereunto affixed my signature in the presence of the witnesses herein named.

GRANVILLE DAVIS.

Witnesses:
G. H. BOINK,
J. H. WELLS.

---

Copies of this patent may be obtained for five cents each, by addressing the "Commissioner of Patents, Washington, D. C."